J. C. POTTER & J. JOHNSTON.
CLUTCH.
APPLICATION FILED MAR. 19, 1904.
916,195.
Patented Mar. 23, 1909.
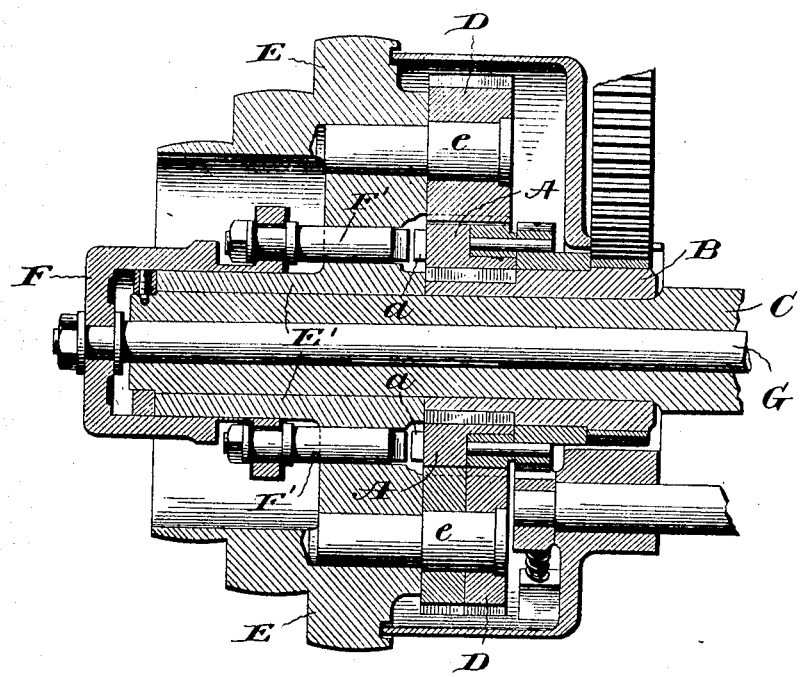

UNITED STATES PATENT OFFICE.

JAMES CHARLES POTTER AND JOHN JOHNSTON, OF PAWTUCKET, RHODE ISLAND, ASSIGNORS TO POTTER AND JOHNSTON MACHINE COMPANY, OF PAWTUCKET, RHODE ISLAND, A CORPORATION OF RHODE ISLAND.

CLUTCH.

No. 916,195.   Specification of Letters Patent.   Patented March 23, 1909.

Application filed March 19, 1904.   Serial No. 199,017.

*To all whom it may concern:*

Be it known that we, JAMES C. POTTER and JOHN JOHNSTON, of Pawtucket, in the county of Providence, and in the State of Rhode Island, have invented a certain new and useful Improvement in Clutches, and do hereby declare that the following is a full, clear, and exact description thereof, reference being had to the accompanying drawing, in which the figure is a longitudinal section of a differential gear in which our clutch is embodied.

The object of our invention is to provide certain improvements in clutch mechanism, and to this end our invention consists in the clutch constructed substantially as hereinafter specified and claimed.

The particular purpose we have had in view in making our invention is the production of a clutch mechanism having special advantages when used in connection with or as a part of differential gearing, and to illustrate our invention, we show and describe it as adapted to differential gearing, but, of course, we do not restrict ourselves to this particular use.

The differential gearing shown comprises, as is usual, sun and planet gearing, consisting of a sun gear A keyed or otherwise fastened to the part to be driven, which, in the case shown, is a sleeve B mounted on a shaft C, and planet pinions D in addition to the other parts that are essential in such a mechanism, which parts need not be described in detail. The pinions D are rotatably mounted on pins or studs *e* that are carried by and project from the side of a cone pulley E loose upon the shaft C. Slidably mounted upon an extension or hub E' of the cone pulley is a clutch sleeve F, to which are attached bolts F' which, respectively, pass through holes in the cone pulley, parallel with the axis thereof, and are adapted, by their ends, to engage clutch teeth *a* on the side of the sun gear A. We are enabled to have good long bearings for the bolts F' in the holes in the cone pulley and, as a result of this, the connection between the bolts and the clutch sleeve can be a loose one, so that, should there be any twisting of the parts, tending to place the clutch sleeve out of alinement, the bolts will be unaffected thereby. Binding of the bolts being thus avoided they can be moved easily and quickly, with the result that change of speed of the differential gear may be instantaneously accomplished. Quick change of speed is very desirable, especially in metal working machines, where variable speeds are imparted to the tool slide, for, when instantaneous change of speed can be effected, the tool slide can be advanced to the work at a high speed until the tool is very close to the work before the change is made to slower working speed.

The construction of clutch shown, besides giving the long bearings for the clutch bolts, permits long bearings to be used for the clutch sleeve and for the cone pulley.

For operating the clutch sleeve F, a sliding rod G is shown passing axially through the shaft C and connected at one end to the clutch sleeve F.

Having thus described our invention, what we claim is:—

The combination of a clutch sleeve, bolts loosely attached thereto, a wheel adapted to be engaged by said bolts, a second wheel lying between said first-mentioned wheel and said sleeve, having holes through which the bolts pass and by which they are guided, and a shaft on which said second wheel has an extended bearing, in the form of a hub, said clutch sleeve having an extended bearing on said hub.

In testimony that we claim the foregoing we have hereunto set our hands.

JAMES CHARLES POTTER.
JOHN JOHNSTON.

Witnesses:
EMIL A. PAQUETTE,
JAMES HEYWOOD.